United States Patent
Clark et al.

(10) Patent No.: US 9,853,935 B2
(45) Date of Patent: Dec. 26, 2017

(54) PLUG-IN FOR EXTENDING FUNCTIONALITY OF MESSENGER APPLICATION ACROSS SUPPLEMENTED AND UNSUPPLEMENTED APPLICATION INSTANCES

(71) Applicant: Facebook, Inc., Menlo Park, CA (US)

(72) Inventors: Jason Duane Clark, Woodinville, WA (US); Benjamin Kyle Padget, San Francisco, CA (US); Christopher Jon Lang, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 305 days.

(21) Appl. No.: 14/691,893

(22) Filed: Apr. 21, 2015

(65) Prior Publication Data

US 2016/0315901 A1  Oct. 27, 2016

(51) Int. Cl.
*H04L 12/58* (2006.01)
*G06Q 30/02* (2012.01)
*G06F 9/445* (2006.01)

(52) U.S. Cl.
CPC .......... *H04L 51/32* (2013.01); *G06F 9/44526* (2013.01); *G06Q 30/0277* (2013.01); *H04L 51/16* (2013.01); *H04L 51/18* (2013.01)

(58) Field of Classification Search
CPC ......... H04L 51/32; H04L 51/16; H04L 51/18; G06F 9/44526; G06Q 30/0277
See application file for complete search history.

(56) References Cited

U.S. PATENT DOCUMENTS

| | | | |
|---|---|---|---|
| 7,747,785 B2 | 6/2010 | Baker et al. | |
| 8,346,864 B1 * | 1/2013 | Amidon | H04L 65/1069 709/204 |
| 8,533,284 B2 | 9/2013 | Shoemaker et al. | |
| 9,014,729 B2 | 4/2015 | Arnold et al. | |
| 2005/0255853 A1 | 11/2005 | Ewert | |
| 2006/0005133 A1 | 1/2006 | Lyle et al. | |
| 2007/0033250 A1 * | 2/2007 | Levin | H04L 12/581 709/204 |
| 2007/0202888 A1 | 8/2007 | Brachet et al. | |
| 2007/0226295 A1 | 9/2007 | Haruna et al. | |
| 2007/0244980 A1 | 10/2007 | Baker et al. | |
| 2012/0265823 A1 | 10/2012 | Parmar et al. | |
| 2012/0304079 A1 * | 11/2012 | Rideout | H04L 12/1818 715/758 |
| 2013/0111365 A1 | 5/2013 | Chen et al. | |

(Continued)

*Primary Examiner* — Kim T Nguyen
(74) *Attorney, Agent, or Firm* — Fenwick & West LLP

(57) ABSTRACT

A first instance of a messenger application having a plug-in communicates with a second instance of the messenger application lacking the plug-in. The plug-in provides enhanced functionality to the first instance of the messenger application, while also providing corresponding functionality to the second instance, which lacks the plug-in. For example, the plug-in may provide rich, non-thread-native content to the first instance, while also providing corresponding thread-native content to the second instance. As another example, the plug-in may obtain data from the second instance and provide tailored advertisements to the second instance based upon that data. An another example, the plug-in may obtain location data from one or more of the instances and provide access to location-specific services that take the location data into account.

20 Claims, 14 Drawing Sheets

(56) References Cited

U.S. PATENT DOCUMENTS

| | | |
|---|---|---|
| 2013/0159432 A1 | 6/2013 | Deering et al. |
| 2013/0179525 A1 | 7/2013 | Granito et al. |
| 2014/0187267 A1 | 7/2014 | Yang |
| 2015/0025882 A1 | 1/2015 | Park |
| 2015/0312176 A1 | 10/2015 | Jones et al. |

* cited by examiner

US 9,853,935 B2

PLUG-IN FOR EXTENDING FUNCTIONALITY OF MESSENGER APPLICATION ACROSS SUPPLEMENTED AND UNSUPPLEMENTED APPLICATION INSTANCES

BACKGROUND

The present invention generally relates to the field of electronic messaging, and more particularly, to providing enhanced messaging capabilities when messenger application plug-ins are installed on a subset of the messenger applications participating in a message thread.

A messenger application allows users to communicate with each other in a conversation thread using content that is "thread-native" (i.e., that is of the type natively included by the messenger application within the thread). Plug-ins to the messenger application could provide a richer user experience, supporting more specialized user interfaces, types of content that need not be thread-native, more sophisticated application logic for specific purposes, and the like. However, the installation of plug-ins for a messenger application is optional, and therefore it is often the case that not all of the participants of the conversation thread have installed the same plug-in. Accordingly, not all participants have direct access to the same functionality afforded by the plug-in.

SUMMARY

A first, supplemented instance of a messenger application having a plug-in communicates with a second, unsupplemented instance of the messenger application lacking the plug-in. The plug-in provides a number of different services in different embodiments.

In one embodiment, the plug-in provides rich, non-thread-native content to the first, supplemented instance, while also providing corresponding thread-native content to the second, unsupplemented instance. The first instance displays a user interface that has a thread area configured to display thread-native content, and the plug-in causes display within a control area of enhanced content not natively displayable within the thread area. The plug-in also converts the enhanced content to equivalent thread-native content and sends it for delivery to the second instance, which can display the equivalent thread-native content within its own thread area. The plug-in of the first instance may also handle additional input beyond that natively handled by the messenger application. Thus, in this embodiment the plug-in can provide (for example) interactive games, that within the first instance are displayed by the plug-in using rich graphics and that can be interacted with through a number of input options within the first instance, and that within the second instance are displayed using thread-native content such as still images and that can be interacted with using more limited input options, such as text commands.

In one embodiment, the plug-in obtains data from the second, unsupplemented instance and provides tailored advertisements to the second instance based upon that data. The obtained data can include thread conversation data (e.g., keywords in textual messages exchanged via the messenger application), social networking profile data of one or more of the users of the first and second instances, and/or device state data of either the first or the second instance (e.g., geolocation data). The plug-in uses the obtained data to obtain an advertisement for display, thereby obtaining advertisements that are relevant to the current messenger conversation.

In one embodiment, the plug-in obtains location data from one or more of the instances and provides access to location-specific services that take the location data into account. The location-specific data may be, for example, a geolocation of a second client device on which the second instance is executing, or a location inferred from keywords in textual messages exchanged via the messenger application. The plug-in generates a location-specific request using the location data and provides it to a location-based service. The plug-in displays an enhanced version of the location-based service's response in the first instance, and causes the display of a thread-native counterpart within the thread area of the second instance. As a first example, the plug-in obtains the location of the second client device on which the second instance is executing and sends a location-specific request, such as a request to send a cab or other item to the location. As a second example, the plug-in obtains locations of (at least) the client devices on which the first and second instances are executing, and sends a request for a recommendation based on the locations—e.g., a recommendation for a restaurant that is near the obtained locations.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
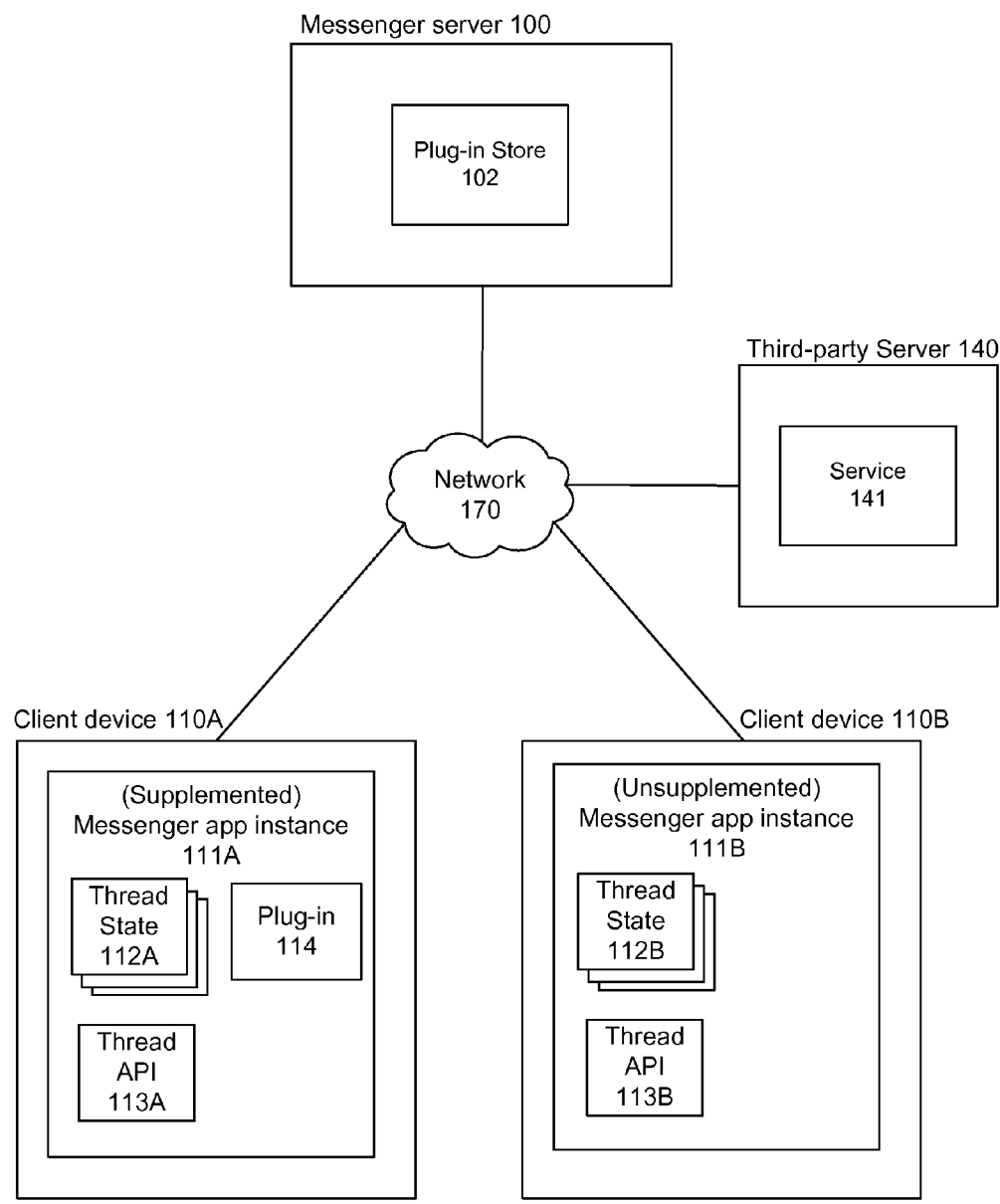
FIG. 1 is a high-level block diagram of a computing environment, according to one embodiment.

FIG. 1 is a high-level block diagram of a computing environment, according to one embodiment. FIG. 1 illustrates a messenger server 100, two client devices 110, and a third-party server 140 connected by a network 170. Users of the client devices 110 use a messenger application—instances 111 of which respectively execute on the client devices 110—to establish a conversation thread using which they can communicate with each other. The messenger application instances 111 may track multiple conversation threads, each of which has a set of participant users that are communicating via that thread. For example, the user of the client device 110A might be using instance 111A of the messenger application to communicate on a first thread with a coworker about their current project, and on a second thread with two friends about where to have dinner.

The network 170 may be any suitable communications network for data transmission. In one embodiment, the network 170 is the Internet and uses standard communications technologies and/or protocols. The client devices 110 are typically located remotely from each other in the sense that they are communicatively coupled via the network 170, but need not be physically proximate.

Each messenger application instance 111A stores a thread state 112 for each of its active conversation threads. The thread state may include, for example, identities of the participant users associated with the thread, and the message items posted to (i.e., included within) the thread.

The messenger application has a set of message item types that may be shown within the thread. For example, the message item types for one particular messenger application might be text and image, meaning that text and images may be shown within the thread. Content having one of the message item types is referred to herein as "thread-native" content, in that it can natively be displayed within the thread by the messenger application. The types of content that are thread-native may be different in different embodiments, such as text and images in one embodiment, text, multimedia (such as images, video, and audio), emojis, stickers, and payment requests in another embodiment, and so forth. In some embodiments, the messenger application has a thread application programming interface (API) 113 that defines the types of the thread-native message items that may be posted to a thread, as well as functions for posting those items to a specified thread.

One of the messenger application instances 111A also has a plug-in 114. The plug-in 114 is code that conforms to a code interface defined by the messenger application and that when executed modifies the behavior and/or appearance of the messenger application instance in which it executes. Messenger application instances 111 having a particular plug-in 114 are herein referred to as "supplemented" application instances 111A with respect to that plug-in; instances 111B lacking that plug-in are referred to as "unsupplemented." As described below, the plug-in 114 may be a third-party plug-in made available by third-party organization providing a service, so that users of the messenger application will more easily be able to use the service.

Figure 2:
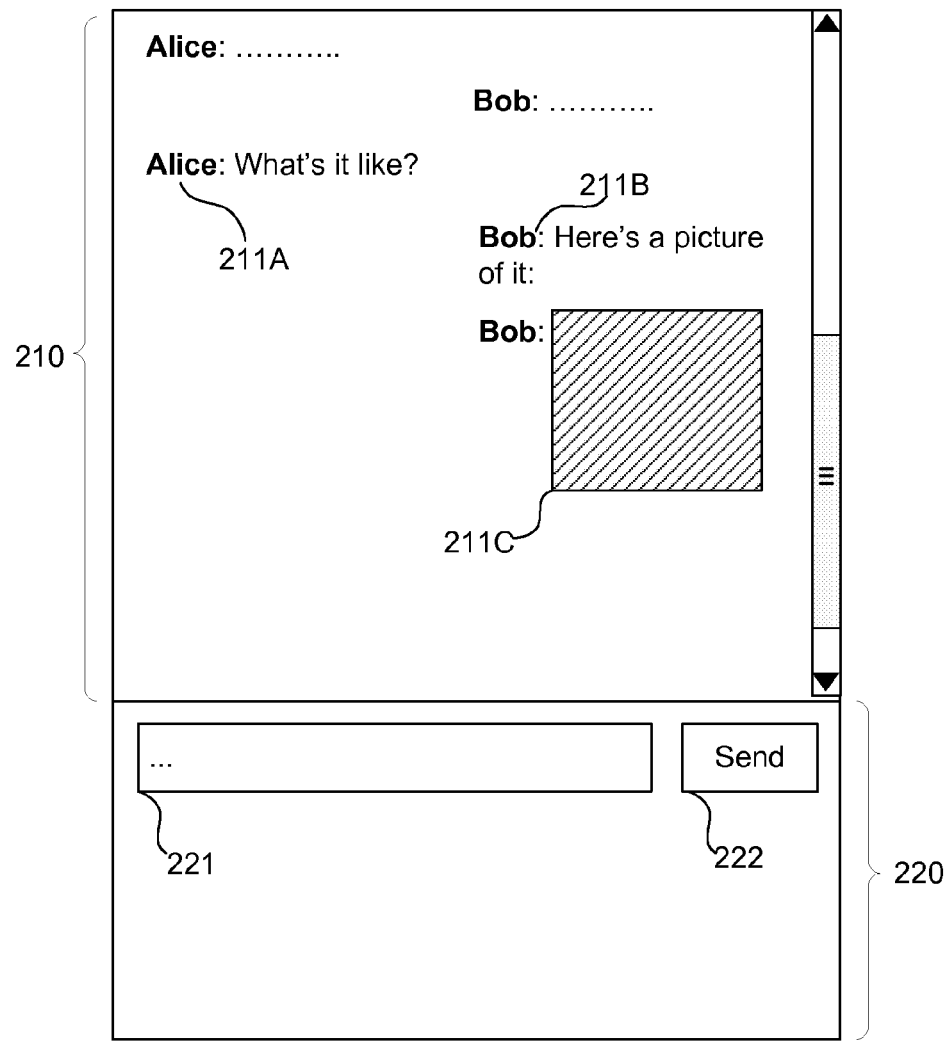
FIG. 2 represents the user interface of a messenger application, according to one embodiment.

FIG. 2 represents the user interface 200 of the messenger application, according to one embodiment. The user interface 200 contains a thread area 210 that displays the message items of a given thread. In the example of FIG. 2, the thread area 210 illustrates a sample thread with a number of message items, including message items 211. Message items 211A and 211B are message items of textual type, and message item 211C is a message item of picture type.

The user interface 200 additionally includes a control area 220. The contents of the control area 220 may differ, depending on which plug-ins 114 (if any) the particular messenger application instance has. In one embodiment, the control area 220 contains at least a text entry area 221 and a send button 222—which are respectively used to enter text to be posted to the thread and to confirm that the entered text should be posted—but the control area 220 may also include additional user interface elements not shown in FIG. 2, such as a user interface element for posting pictures. The control area 220 may include additional user interface elements, and respond to additional user input, as defined by the various plug-ins 114 installed for the corresponding messenger application instance 111. The messenger application may define a plug-in API 113 that the plug-ins 114 can use to lay out a plug-in user interface within the control area 220, to post message items within the thread area 210, and the like.

Returning again to FIG. 1, in one embodiment the messenger server 100 includes a plug-in store 102 that allows individual instances 111A of the messenger application to obtain plug-ins 114, as well as allowing different third-party entities to submit their plug-ins to the plug-in store, whence they can be obtained and then used by clients 110.

The computing environment of FIG. 1 may also include one or more third-party servers 140 providing services 141 accessible to applications via an API. Examples of possible services include, for example, video streaming, cab reservations, venue or item recommendations, social networks, and the like. The various plug-ins 114 may be designed to provide access to the services 141 of the third-party servers 140 within the supplemented instances 111A of the messenger application.

It is appreciated that although for simplicity only two client devices 110 are illustrated in FIG. 1, any given message thread could include any number of client devices (and their corresponding users). Similarly, any of the messenger application instances 111 may have any set of possible plug-ins 114, or no plug-ins at all.

Any set of users may choose to establish a thread of communication between each other via their respective messenger application instances 111. Thus, it may frequently happen that even when one of the users has installed a particular plug-in 114 within his or her messenger application instance 111, the other participating users may not have installed that plug-in. Even in situations where not all of the users participating in a particular thread have installed a particular plug-in 114, the plug-in 114 can nonetheless be used to provide an enhanced user experience for the users as a whole, as is now described in more detail.

One way in which a plug-in 114 can provide an enhanced user experience for all the participating users of a particular thread—even when only one of the participating users has installed that plug-in—is to cause the display of "enhanced content" (i.e., content other than the limited set of thread-native content) for the "supplemented" messenger application instances 111A (i.e., those having the plug-in), while instead causing the display of thread-native content for the "unsupplemented" messenger application instances 111B. For example, a game plug-in 114 could cause display of an animated or otherwise graphically-enhanced version of a game, along with accompanying sound, in the control area 220 of supplemented messenger application instances, and could respond to mouse or other pointer input events in the control area associated with the displayed game as a way of interacting with the game. When communicating with unsupplemented application instances 111B, the plug-in 114 could convert the enhanced visual display of the game to a single still image or other form of thread-native message item and cause it to be displayed as a standard message item within the thread area 210.

Examples of different kinds of enhanced functionality provided by a plug-in of a supplemented application instance 111A now follow.

Examples of Enhanced Content

Figure 3:
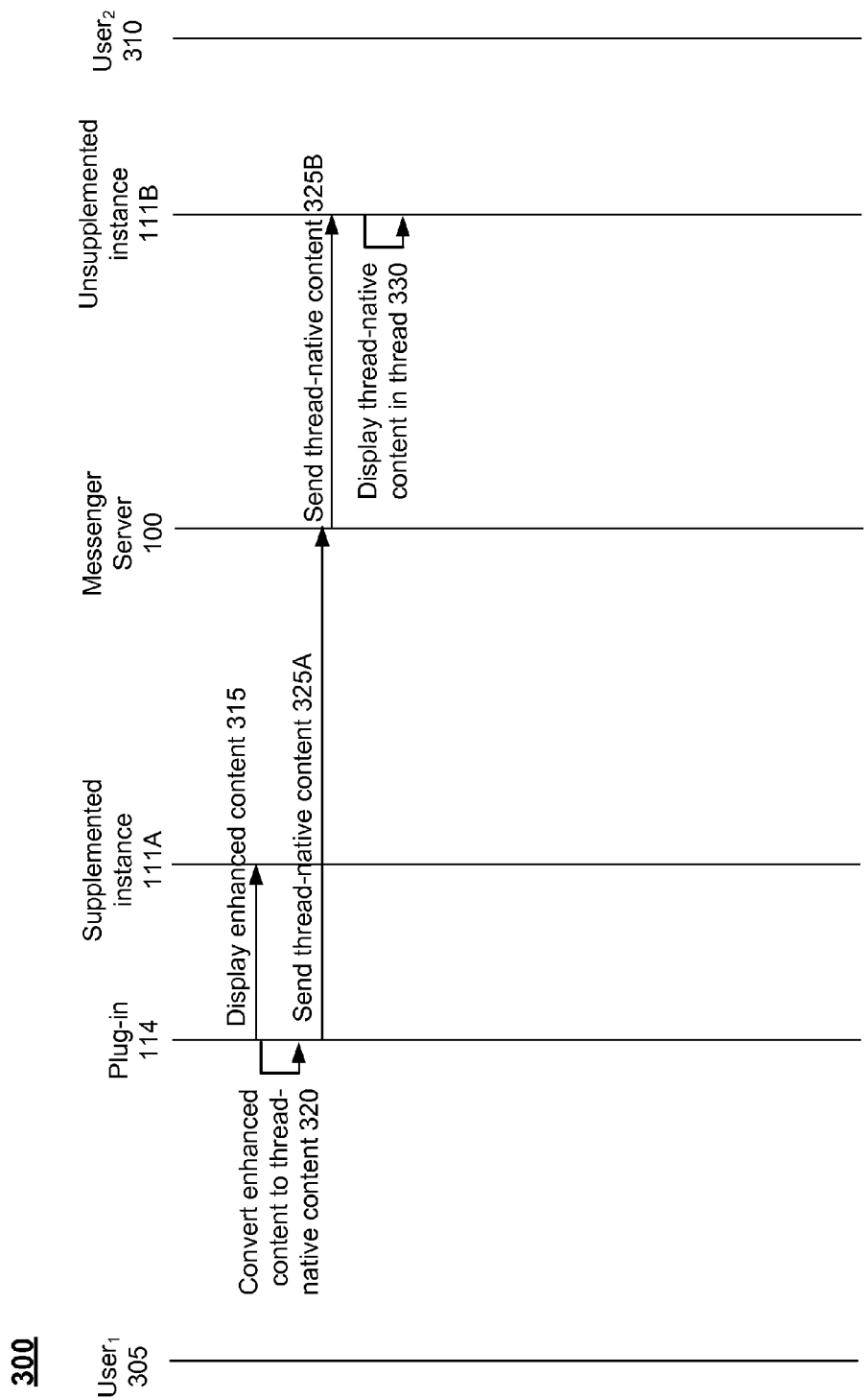
FIG. 3 is a sequence diagram illustrating the interactions between entities of FIG. 1 when a plug-in produces both enhanced and thread-native content for respective use in supplemented and unsupplemented messenger application instances, according to one embodiment.

FIG. 3 is a sequence diagram illustrating the interactions between entities of FIG. 1 when a plug-in 114 produces both enhanced and thread-native content for respective use in supplemented and unsupplemented messenger application instances 111, according to one embodiment.

The first user 305 of a supplemented instance 111A with a plug-in 114 is in communication with a second user 310 of an unsupplemented instance 111B lacking a plug-in. The plug-in 114 displays 315 enhanced content within the control area 220 of the supplemented messenger application instance 111A that it supplements. Assuming, however that the supplemented messenger application instance 111A is communicating with an unsupplemented messenger application instance 111B, the unsupplemented messenger application instance will be incapable of handling the enhanced content. Accordingly, the plug-in 114 converts 320 the enhanced content to corresponding thread-native content that the unsupplemented messenger application instance 111B will be able to handle, and then sends 325 the corresponding thread-native contents to the unsupplemented messenger instance. In one embodiment, content exchanged between messenger application instances is sent through the messenger server 100, although in other embodiments the messenger application instances may communicate at least part of the time in a direct peer-to-peer manner. The unsupplemented messenger application instance 111B receives the thread-native content, and displays 330 that content within its thread area 210.

Figure 4A:
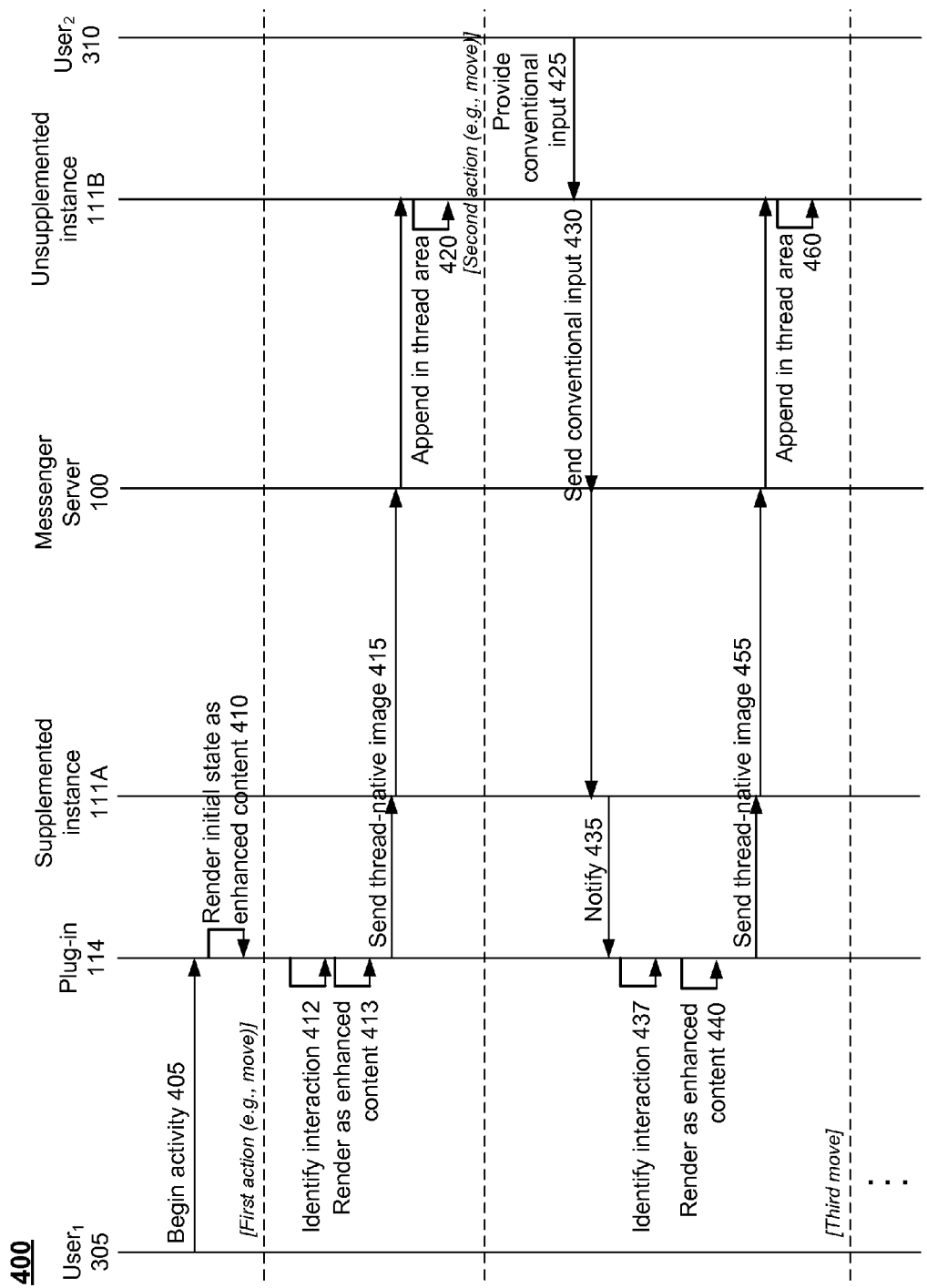
FIGS. 4A and 4B are a sequence diagram and an example user interface, respectively, illustrating two users engaging in a shared activity with the aid of a plug-in, according to one embodiment.
Figure 4B:
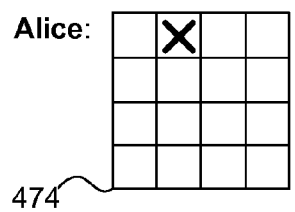
Figure 4B:
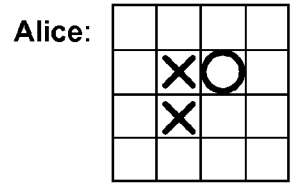
Figure 4B:
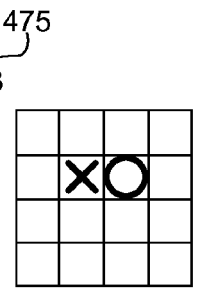
Figure 5A:
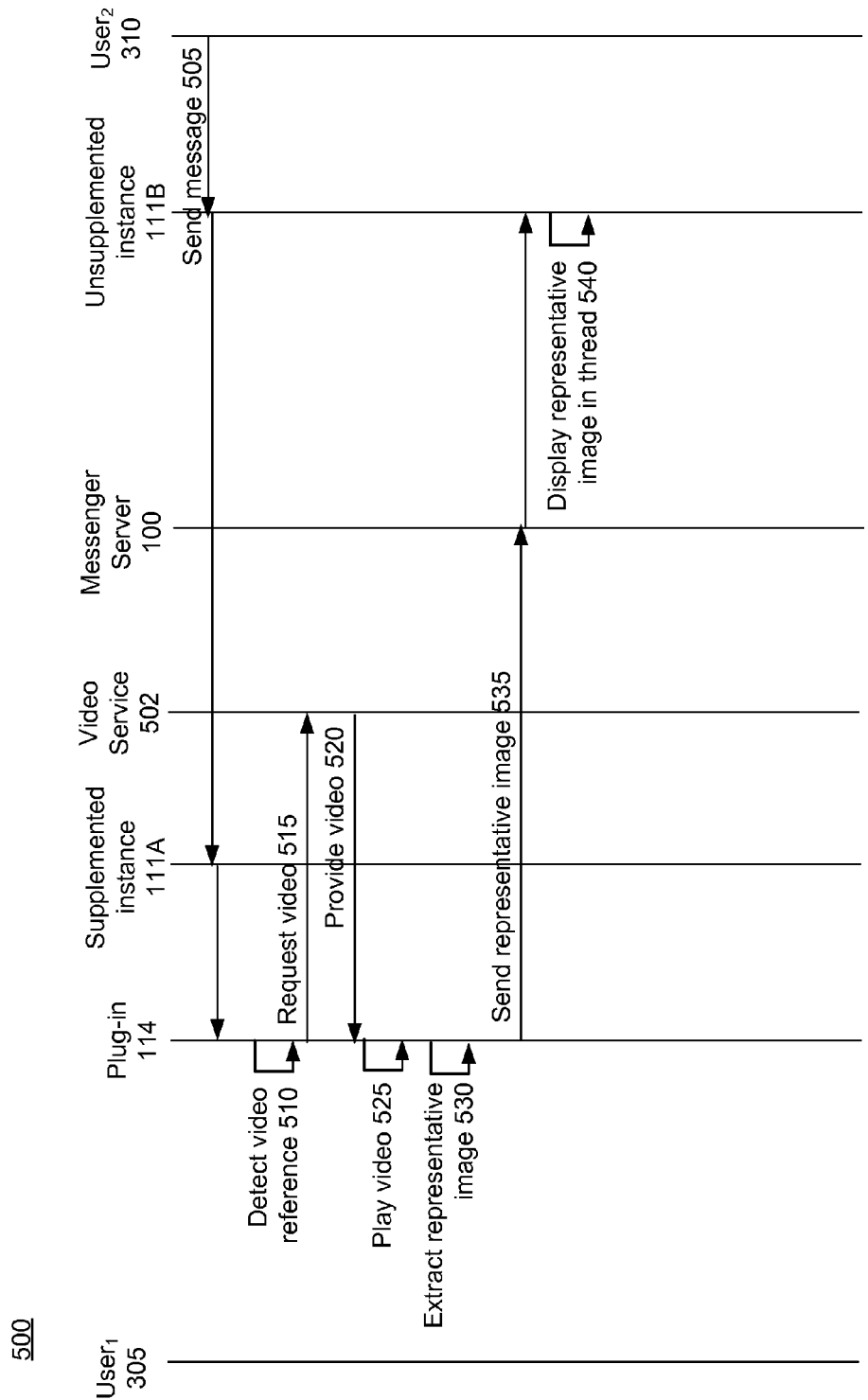
FIGS. 5A and 5B are a sequence diagram and an example user interface, respectively, illustrating two users viewing all or part of the video with the aid of a plug-in, according to one embodiment.
Figure 5B:
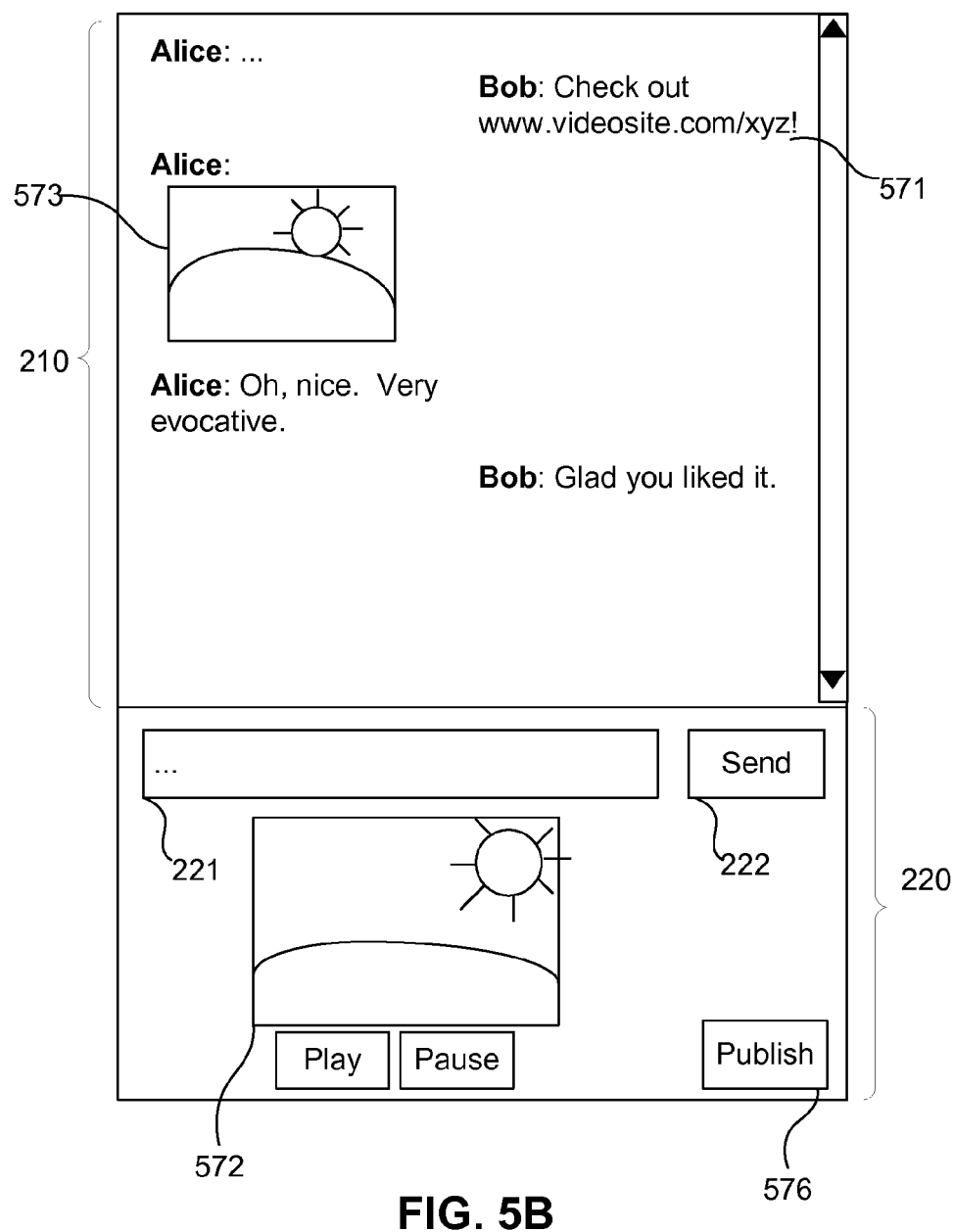

More concrete examples of the interactions of FIG. 3 are now provided with respect to FIGS. 4A and 4B (illustrating a shared activity), and FIGS. 5A and 5B (illustrating the playing of a video).

FIG. 4A is a sequence diagram illustrating the interactions a supplemented messenger application instance 111A and an unsupplemented messenger application instance 111B when their respective users are interactively engaging in a shared activity, according to one embodiment. FIG. 4B illustrates an example user interface that appears within the supplemented messenger application instance when engaging in the shared activity of playing a game of tic-tac-toe, at a point in the game after several moves have been played, according to one embodiment. FIGS. 4A and 4B are now described together.

Initially, a first user 305 of the supplemented messenger application instance 111A begins 405 the shared activity, e.g., via a "New Game" user interface element 471 as illustrated in FIG. 4B. The plug-in 114 of the supplemented messenger instance 111A renders 410 an initial state of the activity (e.g., game) as enhanced content within the control area 220 of the supplemented application instance 111A, which is managed by the plug-in 114. For example, an enhanced game representation 472 in FIG. 4B displays a graphically-enhanced view of the tic-tac-toe board (which in the initial state of the game, before the three moves illustrated in FIG. 4B, would be devoid of pieces). Depending on the nature of the activity supported by the plug-in 114, the enhanced content could include animations, sound, the ability to respond to input events (e.g., pointer clicks or presses), or the like.

The messenger application itself might emit explanatory instructions or other messages as thread-native content (e.g., text). For example, FIG. 4B depicts a message 472 emitted by the application (the tic-tac-toe game application "TTT") informing the second user 310 how to interact with the game using thread-native means (e.g., how to specify a tic-tac-toe move using only textual input).

The user 305 of the supplemented application instance 111A ("Alice") can use the control area 220 (managed by the plug-in 114) to conveniently interact with the game (or other shared activity), and the plug-in receives corresponding input signifying the interaction with the game. For example, she might click or press within the enhanced game representation 472 to indicate the square in which she wishes to place a piece, such as square B2 (one down and one to the right from the top-left of the tic-tac-toe board), and the plug-in 114 would identify 412 the interaction, note her intent, update the state of the game accordingly, and render 413 the state of the game as enhanced content 472 within the control area 220.

Since the unsupplemented messenger application instance 111B is not able to handle enhanced content, the plug-in 114 additionally generates and sends 415 a thread-native counterpart of the enhanced content—in the example of FIG. 4B, a non-interactive image 474 of the state of the game after Alice's first move at step 412. (An image, in this example, is assumed to be a type of content that the unsupplemented messenger application instance 111B can natively handle.) In one embodiment, the plug-in 114 need not directly send 415 the thread-native content, but rather inserts the thread-native content into the thread area 210 of the supplemented messenger application instance 111A using a plugin-API 113 provided by the messenger application, and the instance 111A handles the sending of the inserted thread-native content to the instance 111B in the same way that it would do if the thread-native content had been entered manually by the user 305. This allows the messenger application to operate without a need for its code to change to handle the plug-in 114.

The unsupplemented messenger application instance 111B accordingly receives the thread-native image and appends 420 the image to the thread content, or otherwise places it within its thread area 210. For example, in the example of FIG. 4B the plug-in 114 has placed the image 474 within the thread content so as to attribute it to Alice, since it represents the state of the game after Alice's move. The second user 310 ("Bob") will see this same thread content, including the preliminary textual conversation ("Ready to play?", "Yeah, let's go.", "OK, I'm starting the game.") and the non-interactive image 474, within the thread area 210 of his own unsupplemented messenger application instance 111B, since all such content was generated by or sent to the instance 111B, and is thread-native and hence capable of being displayed by the instance 111B.

Note that the enhanced game representation 472 provided in the control area 220 of the supplemented messenger application instance 111A may differ from its thread-native counterpart. For example, the tic-tac-toe board 472 is visually different from its corresponding image that is displayed within the thread area 210, being both larger and differently colored and shaded. Of course, its visual representation could differ still more markedly, such as being three-dimensional, animated, or having any other graphical representations that would enhance the game experience for the user

305. Additionally, the game representation 472 may be interactive, responding to events such as clicks, presses, drags, and any other sort of event by which the user 305 might wish to interact with the game.

The user 310 provides 425 conventional input natively accepted by the unsupplemented messenger application instance 111B to interact to the game. For example, the user 310 ("Bob") has specified a move using the textual input 475 "B3", indicating that he wishes to place his tic-tac-toe piece row B, column 3. The unsupplemented messenger application instance 111B sends 430 the conventional input to the supplemented messenger application instance 111A, as it would do with any other conventional input.

The supplemented messenger application instance 111A, having knowledge that it has a plug-in 114 (e.g., due to plug-in registration), notifies 435 the plug-in 114 of the arrival of the conventional input. The plug-in 114 accordingly parses the conventional input, identifying 437 the conventional input as representing an interaction with the game. In one embodiment, in order to identify 437 the input as representing an interaction, the plug-in 114 determines whether the conventional input contains a command from a set of possible commands associated with the game (or other activity handled by the plug-in). For example, the input "B3" is considered to constitute a valid command for a game of tic-tac-toe, where valid commands include textual tokens with a valid row number followed by a valid column number (i.e., specifying a particular square in which to place a piece). The plug-in 114 then updates the state of the game to reflect the interaction by the user 310, and renders 440 the state of the game as enhanced content (in this example, by displaying a circle shape indicating a tic-tac-toe piece of the user 310 within square B3). Steps 455 and 460 then proceed in the same manner as steps 415 and 420 to provide the user 310 with a thread-native representation of the current state of the game (namely, the game after two moves have taken place). Similarly, an additional sequence of steps (not depicted in FIG. 4A) similar to steps 412-420 would handle a third move (the second by the user 305), and an additional sequence of steps (also not depicted) similar to steps 425-460 would handle a fourth move (the second by the user 310), and so on.

The plug-in 114 can include, within the control area 220, a user interface element 476 that is used to publish a portion of the shared activity (e.g., gameplay) to an account of the first user 305 on a social networking system, e.g., as a posting item. The plug-in 114 can predefine the portion that is published, or can offer the first user 305 the option to specify how large a portion to publish. For example, in response to selection of the "Publish" button 476 of FIG. 4B, the plug-in 114 for the game might post an image version of the representation 472, or a subset of the message items (e.g., the images 474), or a summary of the game outcome, or any combination thereof, for example.

FIG. 5A is a sequence diagram illustrating the interactions of a supplemented messenger application instance 111A and an unsupplemented messenger application instance 111B when their respective users are viewing and discussing a video, according to one embodiment. Corresponding FIG. 5B illustrates an example user interface that appears within the supplemented messenger application instance at a point after a portion of the video has been viewed and included within the message thread, according to one embodiment.

Initially, the second user 310 sends 505 to the first user 305 a textual message containing a reference to a video. For example, FIG. 5B illustrates a textual message 571 containing the uniform resource locator (URL) "www.videosite.com/xyz". The textual message containing a URL could equally be sent by the first user 305 to the second user 310.

The plug-in 114 detects 510 the reference to the video. For example the plug-in 114 could parse the textual message looking for text matching the format expected for URLs or other reference formats, and if an identified reference refers to a video (e.g., is referring to a domain name of the video service, such as "videosite.com" in the example of FIG. 5B), the plug-in requests 515 the video via the URL from a video service 502 referred to by the reference. The video service accordingly provides 520 the video, e.g., as a stream. The plug-in 114 then plays 525 the received video within the control area 220 of the supplemented messenger application instance 111A of the first user 305, e.g. as a buffered stream. For example, in the example of FIG. 5B, a video with a time-lapsed scene of the sun rising from behind a hill is displayed within video area 572, and the control area 220 additionally contains user interface elements to control playback of the video, such as "play" and "pause" buttons.

Since the unsupplemented messenger application instance 111B of the second user 310 cannot (in this example) natively play video content, the plug-in 114 of the supplemented messenger application instance 111A is responsible for providing the unsupplemented instance 111B with some representative thread-native counterpart of the video. Accordingly, the plug-in 114 generates a representative still image (e.g., one frame of the video) based on the video and sends 535 the representative image to the unsupplemented instance 111B. Since (in this example) an image is thread-native content, the unsupplemented instance 111B can then display 540 the representative image in the thread. For example, FIG. 5B illustrates a representative image 573 displayed within the thread area 210 (which, as previously noted, contains the same content in both the supplemented instance 111A and the unsupplemented instance 111B).

Use of the user interface element 576 displayed by the plug-in 114 within the control area 220 causes sharing of the video, or of a representation thereof (such as a single frame of the video), to an account of the first user 305 on a social networking system, optionally along with context from the thread area 210, such as the textual messages proximate to the sharing of the video (e.g., the textual messages "Check out www.videosite.com/xyz!" and/or "Oh, nice. Very evocative." in FIG. 5B). In one embodiment, the plug-in 114 selects a textual message from the thread area 210 that contains the URL from which the video was obtained (e.g., the message "Check out www.videosite.com/xyz!") for posting to the account of the first user 305, thereby allowing easy access to the video.

Although not illustrated in FIG. 4A-4B or 5A-5B, in some embodiments, portions of the functionality described as being performed by the plug-in 114 may be performed by the messenger server 100. For example, in some embodiments the messenger server 100 may, in whole or in part, perform the translation of supplemented content produced by the plug-in 114 to thread-native content displayable by the unsupplemented instance 111B. This may involve the author of a plug-in 114 also making available a corresponding code module to the messenger server 100, so that the messenger server will be able to convert between the supplemented and thread-native content. For example, to implement the tic-tac-toe game of FIG. 4B, game logic for the tic-tac-toe game could be installed within the messenger server 100 (or within a server communicating with the messenger server 100). Use of the plug-in 114 of the supplemented instance 111A could send a message to the game logic on the messenger server 100, which would generate the appropriate supplemented content and provide it to the plug-in 114 for use within the supplemented instance 111A, and also generate the appropriate thread-native content and provide it to the unsupplemented instance 111B.

Example Provision of Advertising

Figure 6A:
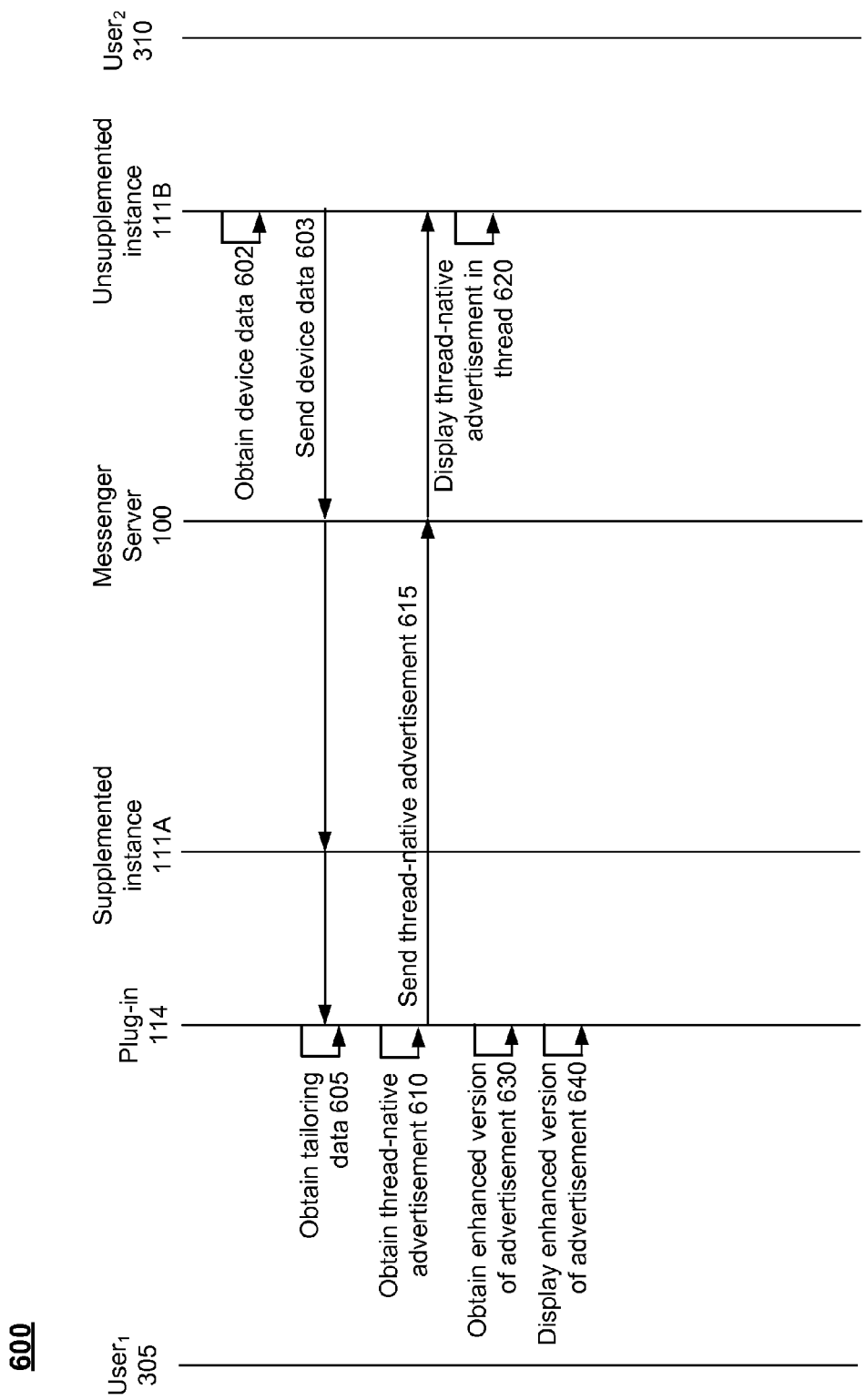
FIGS. 6A and 6B are a sequence diagram and an example user interface, respectively, illustrating a plug-in providing tailored advertisements to the users in a conversation thread, according to one embodiment.
Figure 6B:
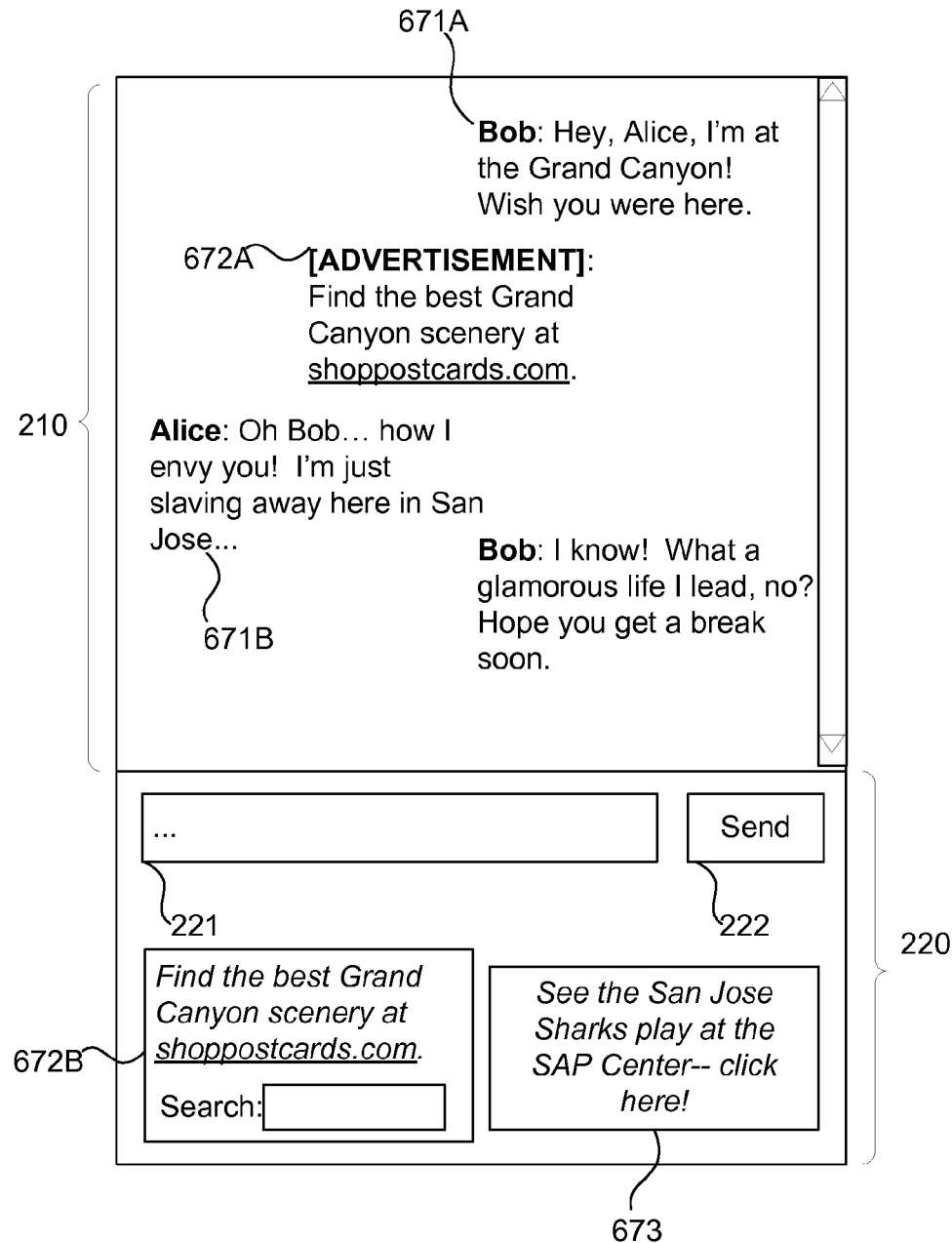

FIG. 6A is a sequence diagram illustrating the provision of tailored advertisements by the plug-in 114 of a supplemented messenger application instance 111A, according to one embodiment. FIG. 6B illustrates an example user interface in which tailored advertisements are provided based on various inputs, according to one embodiment.

The plug-in 114 obtains 605 data that it uses to determine how to best tailor advertisements to the current context. In one embodiment, the obtained data that may be used to tailor the advertisements includes: thread conversation data (content exchanged between the conversation thread participants using the messenger application, such as keywords from the various textual messages in the thread); social networking profile data (data about the first user 305 obtained from a social networking system, presuming that the first user has an account on such a system, and the plug-in 114 has been granted access to that account); and device state data of the client device of the supplemented instance 111A (e.g., geolocation data). The tailoring data can also include data provided by the client device of the unsupplemented instance 111B, and thus step 605 may entail the unsupplemented instance 111B obtaining 602 device data (e.g., the geolocation of the device, such as a GPS coordinates) and sending 603 the device data to the plug-in 114.

Regardless of the exact type of the tailoring data, the plug-in 114, having obtained a 605 the tailoring data, obtains and provides tailored advertisements using the tailoring data. For example, the plug-in 114 could obtain 610 a tailored advertisement by querying a remote database of candidate advertisements, including the tailoring data (or data derived therefrom) as part of the query. In one embodiment, the plug-in 114 provides the tailored advertisements to the unsupplemented instance 111B, which (since it lacks its own plug-in) is unable itself to generate such advertisements. Thus, after the plug-in 114 generates or otherwise obtains 610 a thread-native advertisement, it sends 615 the thread-native advertisement to the unsupplemented instance 111B. The unsupplemented instance 111B then displays 620 the thread-native advertisement in this thread area 210.

The plug-in 114 could also obtain 630 an enhanced (non-thread-native) version of an advertisement, such as an enhanced counterpart of the thread native advertisement optionally obtained at step 610. For example, the plug-in 114 could query the remote database of candidate advertisements in the same way as when obtaining a thread-native advertisement, but instead specifying and obtaining an enhanced (non-thread-native) advertisement, such as a video/animated advertisement, or an interactive advertisement. Alternatively, the plug-in 114 could obtain an enhanced version of an advertisement at step 630 (e.g., by querying the remote database), and could afterwards obtain a thread-native counterpart advertisement at step 610 by converting the enhanced version of the advertisement to a thread-native version (e.g., by automatically extracting a single frame of the video advertisement). The plug-in 114 then displays 640 the enhanced version of the advertisement within the control area 220.

Referring to the example of FIG. 6B, for instance, the second user 310 ("Bob") is currently at the Grand Canyon in Arizona and is communicating with the first user 305 (his friend Alice), who is in San Jose, Calif. The plug-in 114 within Alice's supplemented instance 111A might use, as tailoring data, the content of the communication thread between the two users, such as textual keywords "Grand Canyon" in the textual message 671A, or "San Jose" in the textual message 671B. The tailoring data could also include geolocation data (e.g., GPS coordinates) of Alice's client device, or of Bob's client device (as provided by Bob's client device via steps 602 and 603 of FIG. 6A).

Continuing the example of FIG. 6B, the plug-in 114 has used the tailoring data (e.g., the keywords "Grand Canyon" that are part of the thread text 671A, or GPS data provided by Bob's client device) to infer that Bob is currently at the Grand Canyon. Accordingly, the plug-in 114 queries a remote advertising database for the term "Grand Canyon", obtaining the enhanced advertisement depicted in area 672B, and the thread-native advertisement rendered as text 672A within the frame itself. Since the thread-native advertisement is visible within the thread area 210 of the unsupplemented instance 111B, Bob, like Alice, will be able to see the advertisement, even though his unsupplemented instance 111B lacks the plug-in 114. Alice, having the supplemented instance 111A, will be able to see not only the thread-native advertisement 672A, but will also see the enhanced advertisement at area 672B, an interactive advertisement (e.g., a FLASH-based advertisement) which additionally contains a user input field allowing Alice additionally to search for items others than those associated with the term "Grand Canyon."

In the example of FIG. 6B, the plug-in 114 has also determined from the tailoring data (e.g., the keywords "San Jose" in the text message 261B sent by Alice, or GPS location of Alice's client device) that Alice is in San Jose. Accordingly, the plug-in 114 obtains an enhanced advertisement that is specific to San Jose, displaying it in the control area 220 at area 673. The plug-in 114 additionally determines that the location "San Jose" is an attribute of Alice, and that that location is different from that of Bob (whose location has already been determined to be the Grand Canyon). The plug-in accordingly refrains from creating a thread-native version of the advertisement 673 for providing to Bob's unsupplemented application instance 111B, since the advertisement would be less relevant to someone at a different location. Similarly, the plug-in 114 could have refrained from displaying the advertisements 672A, 672B within the thread area 210 of the supplemented instance 111A—instead only causing display of the advertisement 672A within the thread area 210 of the unsupplemented instance 111B—if it is determined that the advertisement 672 would only be of relevance to the second user 210.

Although not illustrated in FIGS. 6A-6B, in some embodiments, portions of the functionality described as being performed by the plug-in 114 may be performed by the messenger server 100. For example, in some embodiments the messenger server 100 may, in whole or in part, obtain 605 the ad-tailoring data from the instances 111, and select and provide advertisements to the instances based on the ad-tailoring data.

Example of Location-Enhanced Services

Figure 7:
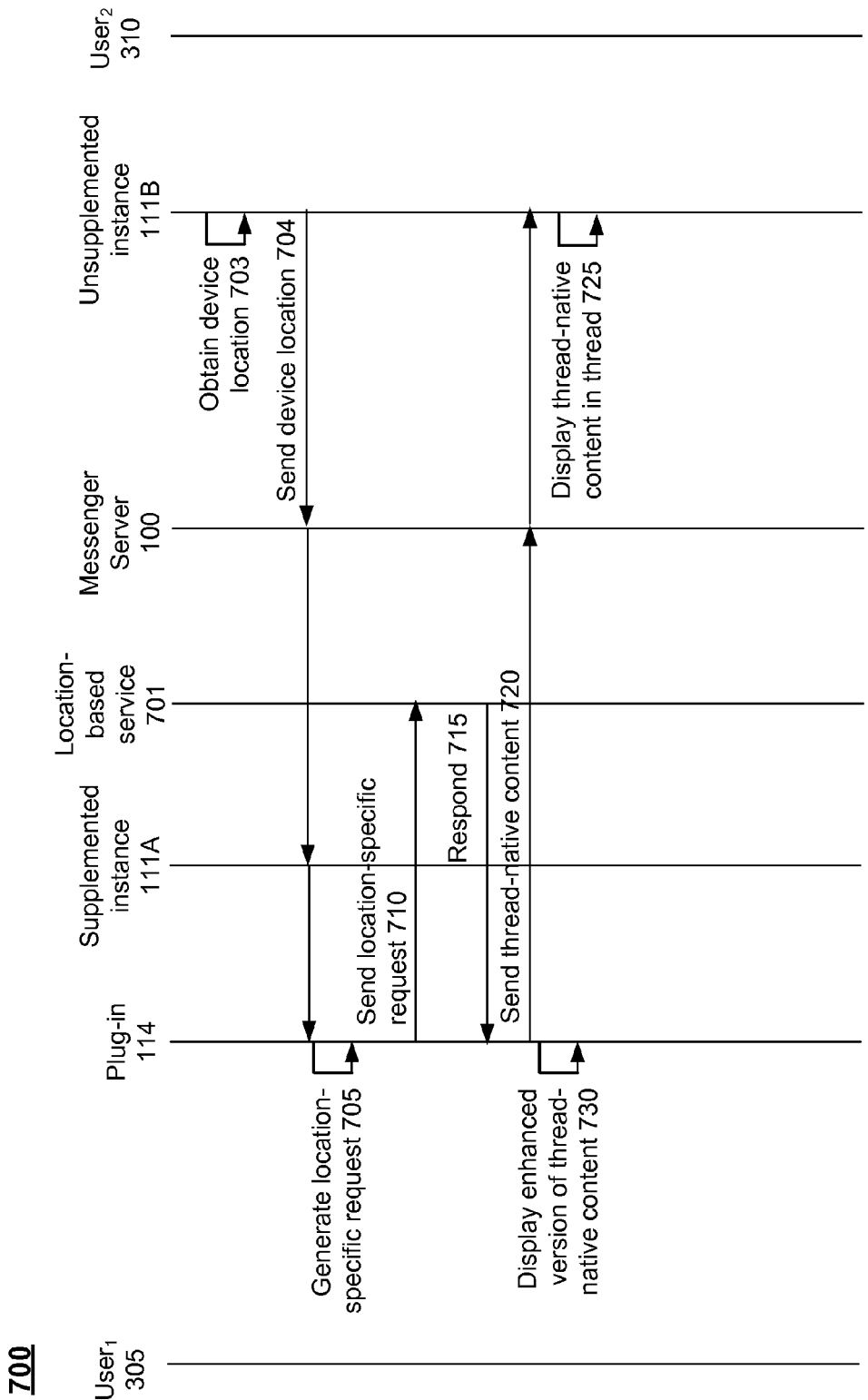
FIG. 7 is a sequence diagram illustrating the interactions between entities of FIG. 1 when a plug-in provides access to location-based services within messenger application instances, according to one embodiment.

The plug-in 114 can also obtain and intelligently use location data so as to provide access to services that conveniently take location into account. FIG. 7 is a sequence diagram illustrating the interactions between entities of FIG. 1 when a plug-in 114 provides access to location-based services within messenger application instances 111, according to one embodiment.

Initially, the unsupplemented instance 111B obtains 703 a location of the client device on which it is executing, such as a GPS geolocation, and sends 704 the location to the supplemented instance 111A. The plug-in 114 of the supplemented instance 111A then obtains the location from the supplemented instance 111A, e.g., in response to having previously registered a location-related callback function with the supplemented instance 111A.

The plug-in 114 uses the location to generate 705 a location-specific request, and then sends 710 the location-specific request to a remote location-based service 701. The location-based service 701 may be any network-available service that can accept a request that includes location information and can take that location into account when responding to the request. For example, the location-based service 701 could be a map service capable of showing maps of given locations, a search-based service providing search results geared toward particular locations, delivery services that send items or people to a particular location, and the like.

The plug-in 114 may also show a result of the response 715. For example, the plug-in 114 sends 720 response-specific data (i.e., the response data itself, or data derived from the response data) as thread-native content to the unsupplemented instance 111B, which then displays 725 response-specific data within its thread area 210. The plug-in 114 may also display 730 an enhanced version of the response-specific data within the control area 220.

Figure 8A:
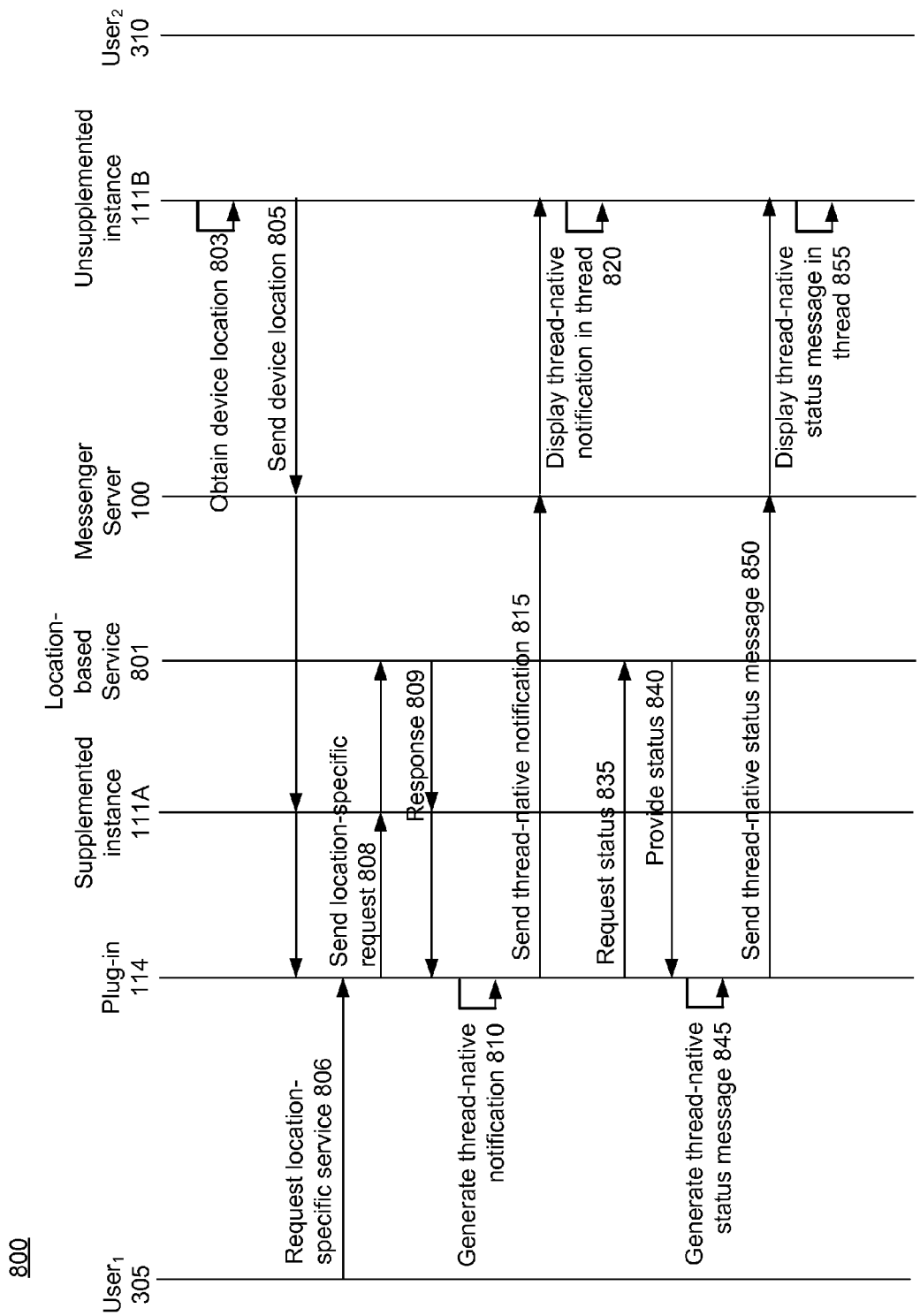
FIGS. 8A and 8B are a sequence diagram and an example user interface, respectively, illustrating a plug-in facilitating the sending of an item or service to a particular location, according to one embodiment.
Figure 8B:
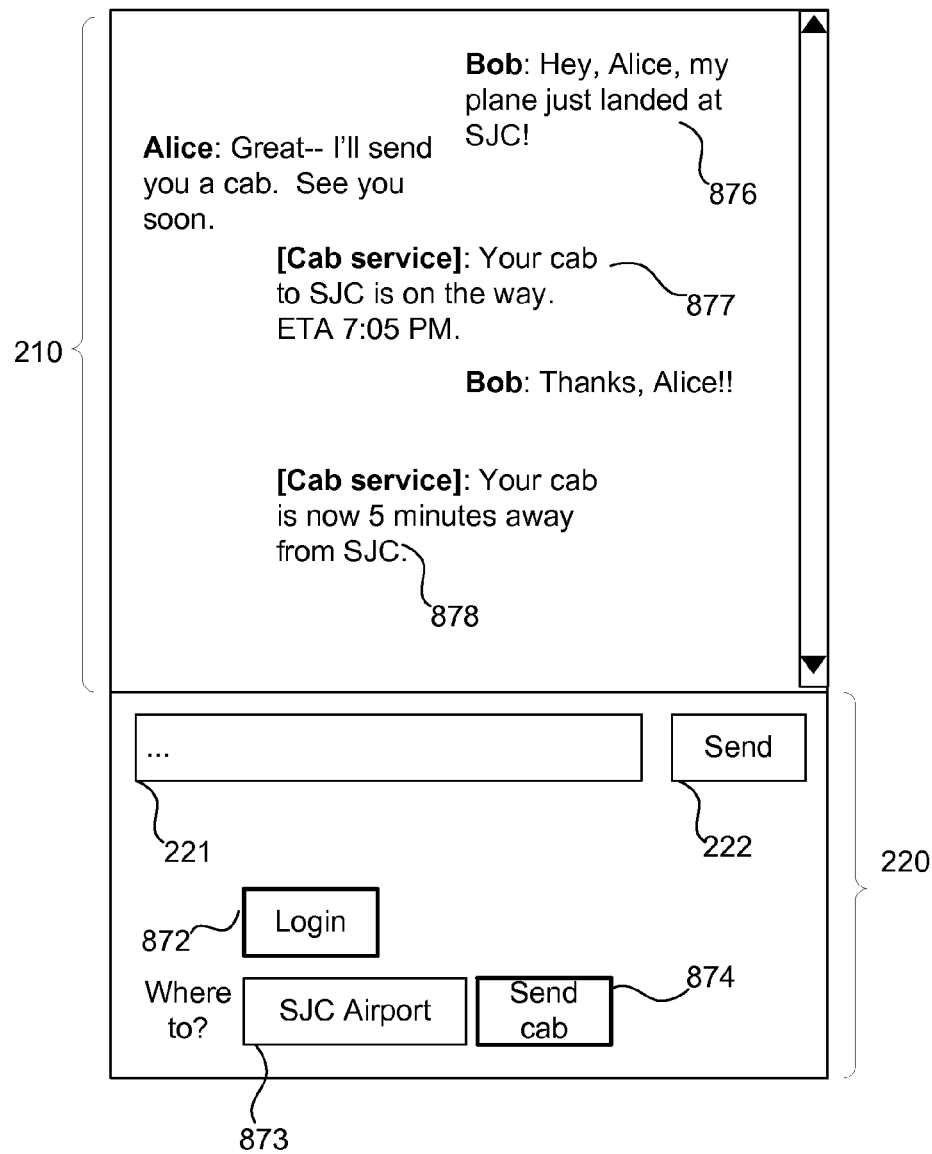
Figure 9A:
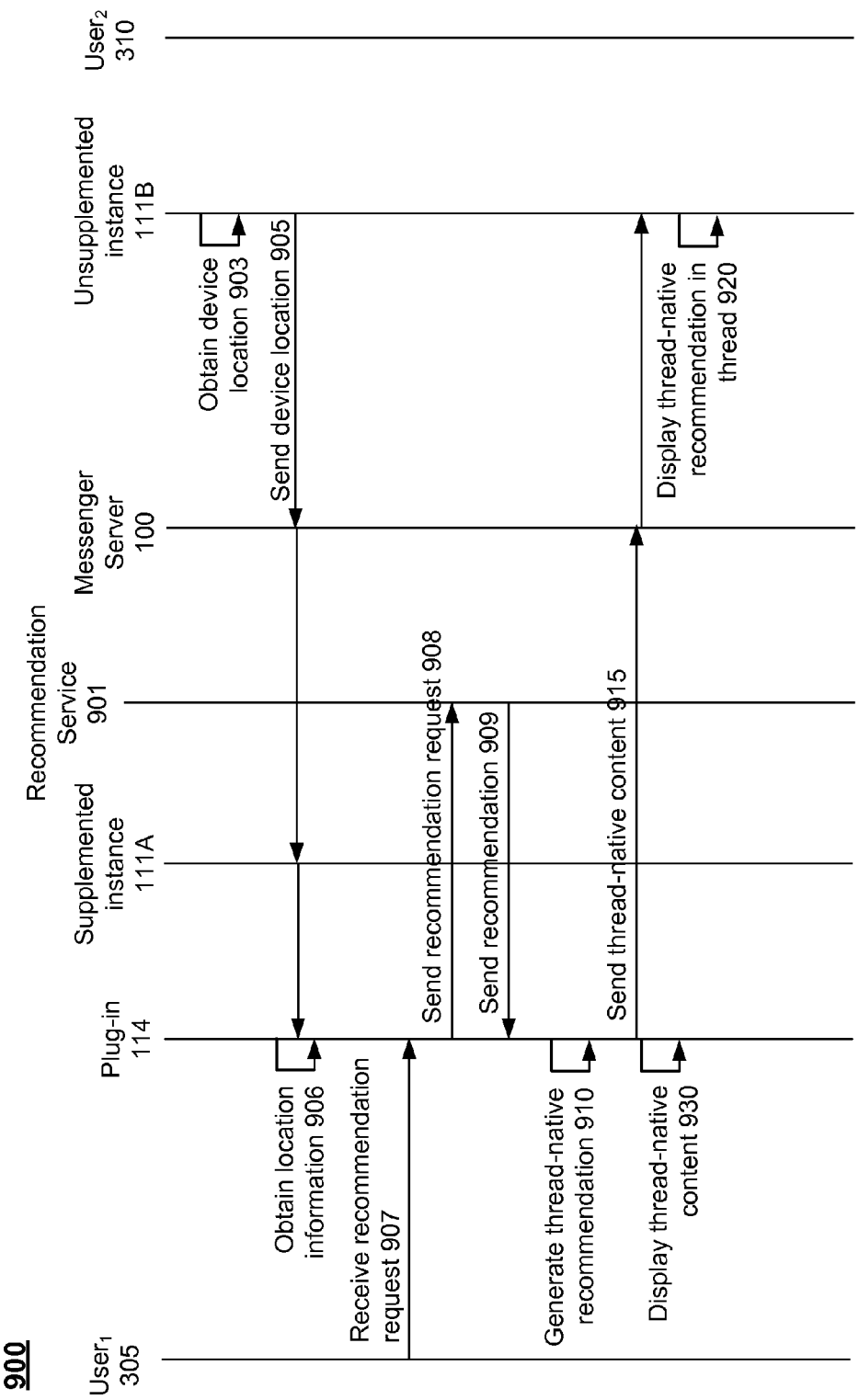
FIGS. 9A and 9B are a sequence diagram and an example user interface, respectively, illustrating a plug-in facilitating the obtaining of location-specific recommendations, according to one embodiment.
Figure 9B:
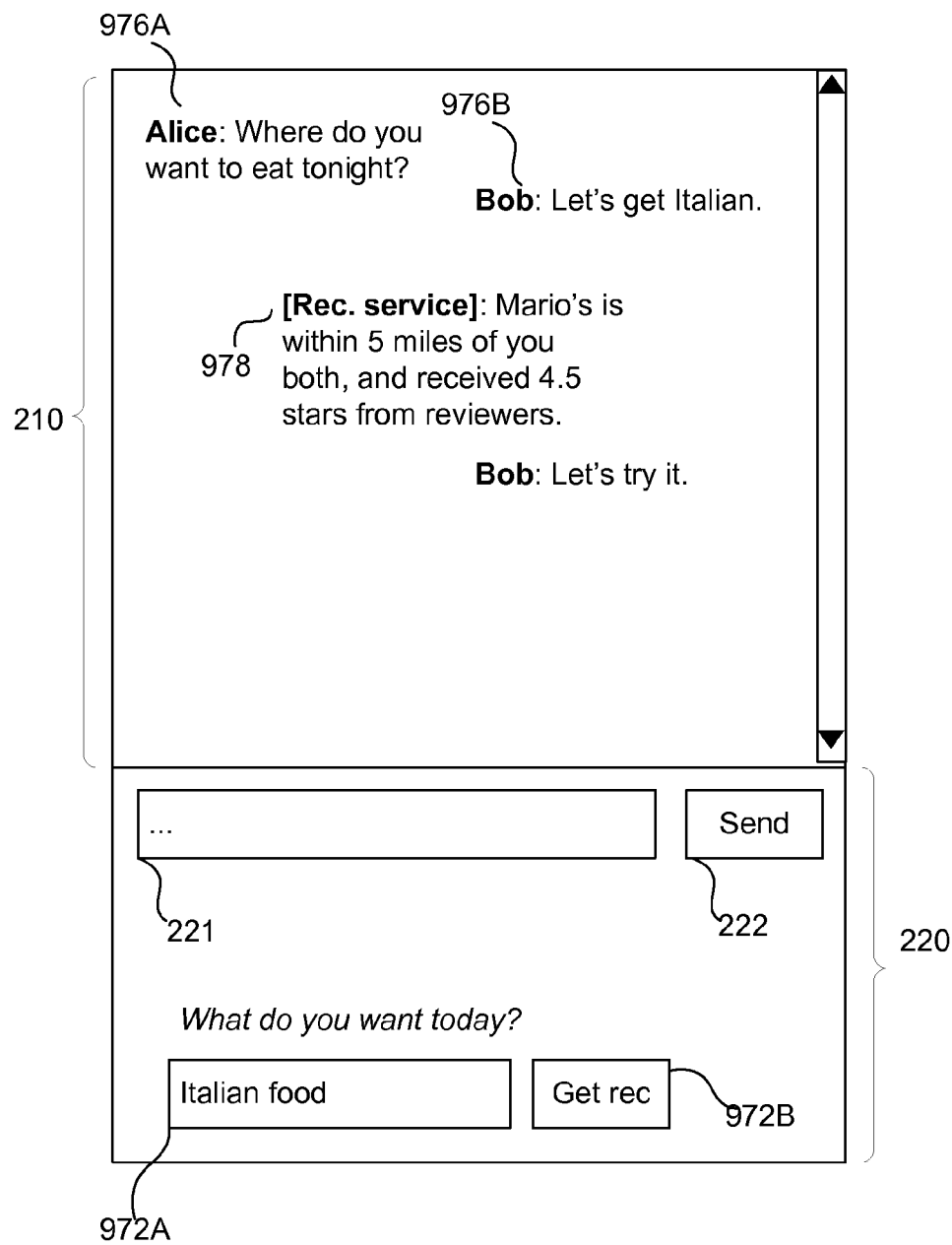

More concrete examples of the interactions of FIG. 7 are now provided respect to FIGS. 8A and 8B (illustrating the sending of a product or service—specifically, a cab—to the given location), and FIGS. 9A and 9B (illustrating the obtaining and presentation of location-specific recommendations).

FIG. 8A is a sequence diagram illustrating the interactions of a supplemented messenger application instance 111A and an unsupplemented messenger application instance 111B when sending something to a particular location, according to one embodiment. FIG. 8B illustrates an example user interface that appears within the supplemented messenger application instance 111A when sending a cab to a location of the unsupplemented messenger application instance 111B, according to one embodiment.

In FIG. 8A, the unsupplemented instance 111B obtains 803 the location of the client device on which it is executing (i.e., the location of the second user 310), e.g. as a GPS coordinate, and sends 805 the device location to the supplemented instance 111A, where it is available to the plug-in 114. As an alternative to the unsupplemented messenger application instance 111B explicitly obtaining and providing its location, the supplemented instance 111A could in some cases indirectly infer the location of the second user, e.g., by analyzing the text of the conversation in the thread, or the first user 305 could manually do so.

The first user 305 using the supplemented application instance 111A requests 806 a location-specific service using the known location of the second user 310. For example, referring to FIG. 8B, the plug-in 114 supplements the control area 220 with controls 872-874 for requesting cab pickup at a particular location. (In such a case, the plug-in 114 could be provided by the cab service to make it easier to use its service via the messenger application.) The text field 863 could be filled in automatically in response to receipt of the device location of the second user 310 at step 805, or in response to the plug-in 114 interpreting the text "my plane just landed at SJC" in the textual message 876, and/or it could be filled in manually by the first user 305. The user 305 can use the button 872 to login to the user's account with the cab service, the text field 873 to specify a street address or other description (e.g., a GPS coordinate) to which to send a cab, and the button 874 to request 806 the cab service (the location-based service 872).

The plug-in 114 then sends 808 a location-specific request to the location-based service 802, such as (in FIG. 8B) a request to send a cab to the location "SJC Airport".

Optionally, the plug-in 114 can keep the users informed of the status of the request by communicating with the location-based service 802 and updating the user interface accordingly. For example, the plug-in 114 can receive a response 809 from the location-based service 802 in response to the initial request and can generate 810 an initial thread-native notification summarizing the response, placing it within the thread area 210 of the supplemented instance 111A. For instance, in FIG. 8B, the plug-in 114 has inserted a textual message 867 indicating that the request for a cab was successful and that the estimated time of arrival of the cab is 7:05 PM. The plug-in 114 also sends 815 the thread-native notification 815 to the unsupplemented instance 111B, which then displays 820 the notification's within its own thread area 210, which the second user 310 can see.

Similarly, the plug-in 114 can request 835 status updates from the location-based service 802, receive 840 the resulting status updates, and in turn update the user interface is to display the status messages. For example, the plug-in 114 can generate 845 a thread-native status message, displaying it within the thread area of the of the supplemented instance 111A, and also sending 850 the thread-native status message to the unsupplemented instance 111B, which then displays 855 thread-native status message in its own thread area 210. For instance, referring again to FIG. 8B, the plug-in 114 has added to the thread a thread-native (textual) message 878 indicating that the cab is now five minutes away from the destination. The request 835 may be accomplished in different manners in different embodiments, such as the plug-in 114 polling the location-based service 801, or the plug-in registering with the location-based service 801 to receive notifications, e.g., at periodic intervals until the original request 806 has been completed.

FIG. 9A is a sequence diagram illustrating the interactions of a supplemented messenger application instance 111A and an unsupplemented messenger application instance 111B when (implicitly or explicitly) obtaining location-based recommendations, according to one embodiment. FIG. 9B illustrates an example user interface that appears within the supplemented messenger application instance 111A when obtaining the location-based recommendations, according to one embodiment.

The plug-in 114 obtains 906 location information in order to improve the quality of recommendations. In one embodiment, this involves obtaining location information from the client device of the unsupplemented instance 111B in steps 902, 905, in the same manner as steps 802, 805 in FIG. 8A. Obtaining location information may also involve the plug-in 114 obtaining location information, such as by directly querying the operating system of the client device on which the plug-in is executing to obtain GPS coordinates from device location hardware.

At some point (possibly after the location information is obtained 906), the plug-in 114 receives 907 a recommendation request from the first user 305. For example, referring again to FIG. 9B, a recommendation plug-in 114 has supplemented the control area 220 with user interface elements 972 for specifying a recommendation request to be submitted to a recommendation service 902. Following the discussion illustrated in textual messages 976, the first user 305 (Alice) could use the user interface elements 972 to explicitly request a recommendation for "Italian food", which the plug-in 114 then sends 908 to the recommendation service 902. In one embodiment, the plug-in 114 implicitly includes, within the recommendation request that it sends to the recommendation service 902, the location information obtained in step 906 (e.g., GPS coordinates of the client devices both of the supplemented instance 111A and of the unsupplemented instance 111B, or, more generally, of the client devices of all of the application instances 111 participating in the thread). In another embodiment, the plug-in 114 lists the obtained location information within the content area 220, so that the first user 305 can further edit it, specify that it not be part of the recommendation request, or the like. The plug-in 114 can further supplement the user interface provided in the control area to allow the user to specify other recommendation request parameters, such as whether to provide recommendations that are the highest-ranking, that are the most recent, or the like.

In another embodiment, the plug-in 114 analyzes text within the thread (e.g., the textual item 976) and either automatically or semi-automatically generates the recommendation request. For example, upon encountering the word "Italian" in textual message 976B, within the existing context of eating as established by textual message 976A, the plug-in 114 could automatically enter the text "Italian food" within the text field user interface element 972A, optionally along with an indicator to the user (e.g., a temporary pop-up balloon) that the user might wish to request a recommendation for it via the user interface element 972B. Alternatively, the plug-in 114 could automatically send 908 the recommendation request, without requiring the user to explicitly use the user interface element 972B.

The recommendation service 902 responds to the request by sending 909 the recommendation, which the plug-in 114 receives. The plug-in 114 generates 910 thread-native (e.g., textual) content representing the recommendation if it is not already in thread-native format, including optionally converting the recommendation to a more compact or otherwise presentable representation. The plug-in 114 sends 915 the thread-native content representing the recommendation to the unsupplemented instance 111B, which displays 920 thread-native recommendation within the thread area 210. The plug-in 114 likewise causes display of the thread native content representing the recommendation within the thread area 210 of the supplemented instance 111A, e.g., by using a message-posting function of an API defined by the messenger application. For example, referring to FIG. 9B, the thread-native content representing the recommendation is the textual message 978, which lists a restaurant whose having Italian cuisine, a location nearby to the locations of both of the users 305, 310 in the thread, and a high user rating.

Although not illustrated in FIG. 8A-8B or 9A-9B, in some embodiments, portions of the functionality described as being performed by the plug-in 114 may be performed by the messenger server 100. For example, in some embodiments the messenger server 100 may, in whole or in part, obtain the location information of the instances 111, generate 705 and send 710 the location-specific request, receive the response 715 from the location-based service 701, and provide enhanced and/or thread-native content to the instances based on the response 715.

Other Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims below.

What is claimed is:

1. A computer-implemented method comprising:
    establishing, by a first instance of a messenger application executing on a first client device and having a messenger plug-in, a conversation thread with a second instance of the messenger application executing on a second client device, the second instance lacking the messenger plug-in, the first client device and the second client device being in communication using the first instance and the second instance;
    displaying, by the first instance, a user interface having a thread area configured to display thread-native content;
    by the messenger plug-in of the first instance:
        causing display of enhanced content within a control area of the user interface, the enhanced content not natively displayable within the thread area; and
        converting the enhanced content to the thread-native content capable of being natively displayed within the thread area; and
    sending the thread-native content for delivery to the second instance of the messenger application that lacks the messenger plug-in, the second instance of the messenger application configured to display the thread-native content within a thread area configured to display the thread-native content.

2. The computer-implemented method of claim 1 comprising:
    responsive to sending the thread-native content, receiving a textual message from the second instance; and
    the messenger plug-in updating the enhanced content within the control area based on the textual message.

3. The computer-implemented method of claim 2, wherein updating the enhanced content comprises determining whether the textual message includes a command from a set of possible commands associated with the messenger plug-in.

4. The computer-implemented method of claim 2, wherein the messenger plug-in causes display of the textual message within the thread area of the first instance.

5. The computer-implemented method of claim 1, further comprising by the messenger plug-in:
receiving user input; and
responsive to receiving the user input:
updating the enhanced content within the control area;
re-converting the thread-native content to correspond to the updated enhanced content; and
sending the re-converted thread-native content to the second instance of the messenger for display within the thread area of the second instance.

6. The computer-implemented method of claim 5, further comprising the messenger plug-in rendering user interface controls within the control area, wherein the user input corresponds to the rendered user interface controls.

7. The computer-implemented method of claim 5, further comprising the messenger plug-in rendering user interface controls within the control area, wherein the user input comprises a click or press associated with the enhanced content.

8. The computer-implemented method of claim 1, further comprising the messenger plug-in:
rendering, within the control area, a control for publishing a representation of the enhanced content to a social networking system; and
responsive to selection of the control, publishing a portion of the enhanced content to the social networking system.

9. A computer-implemented method comprising:
establishing, by a first instance of a messenger application having a messenger plug-in, a conversation thread with a second instance of the messenger application running on a remote client device, the second instance lacking the messenger plug in;
displaying, by the first instance, a user interface having a thread area configured to display items of thread-native content;
displaying, by the messenger plug-in within a control area of the user interface of the first instance: a visual representation of a state of an activity engaged in by a user of the first instance and a user of the second instance, and user interface controls for interaction with the activity, the visual representation not natively displayable within the thread area;
the messenger plug-in generating a thread-native image corresponding to the visual representation of the state of the activity; and
sending the generated thread-native image for delivery to the second instance of the messenger application for display within a thread area of the second instance.

10. The computer-implemented method of claim 9 comprising:
responsive to sending the generated thread-native image, receiving a textual message from the second instance;
the messenger plug-in interpreting the textual message as an interaction of the second user of the second instance with the activity; and
the messenger plug-in updating the visual representation within the control area based on the interaction.

11. The computer-implemented method of claim 10, wherein interpreting the textual message as an interaction comprises determining whether the textual message includes a command from a set of possible commands associated with the activity.

12. The computer-implemented method of claim 10, wherein the messenger plug-in causes display of the textual message within the thread area of the first instance.

13. The computer-implemented method of claim 9, further comprising the messenger plug-in:
receiving user input signifying an interaction with the activity; and
responsive to receiving the user input:
updating the visual representation within the control area;
regenerating the thread-native image to correspond to the updated visual representation; and
sending the regenerated thread-native image to the second instance of the messenger application for display within the thread area of the second instance.

14. The computer-implemented method of claim 13, wherein the user input corresponds to use of one of the user interface controls within the control area.

15. The computer-implemented method of claim 13, wherein the user input comprises a click or press associated with the visual representation.

16. The computer-implemented method of claim 9, wherein the visual representation includes animation.

17. The computer-implemented method of claim 9, further comprising the messenger plug-in:
displaying, as one of the user interface controls for interaction with the activity, a control for publishing a representation of the activity to a social networking system; and
responsive to selection of the control, publishing a portion of the activity to the social networking system.

18. A non-transitory computer-readable storage medium storing instructions for a messenger plug-in, the instructions executable by a processor and comprising:
instructions for displaying, within a control area of a user interface of a first instance of a messenger application having the messenger plug-in, the first instance sharing a conversation thread with a second instance running on a remote client device and lacking the messenger plug-in:
a visual representation of a state of an activity engaged in by a user of the first instance and a user of the second instance, and
user interface controls for interaction with the activity, the visual representation not natively displayable within a thread area of the user interface configured to display items of thread-native content;
instructions for generating a thread-native image corresponding to the visual representation of the state of the activity; and
instructions for sending the generated thread-native image for delivery to the second instance of the messenger application for display within a thread area of the second instance.

19. The non-transitory computer-readable storage medium of claim 18, further comprising:
instructions for interpreting a textual message received from the second instance as an interaction of the second user of the second instance with the activity; and
instructions for updating the visual representation within the control area based on the interaction.

20. The non-transitory computer-readable storage medium of claim 18, further comprising:
   instructions for receiving user input signifying an interaction with the activity; and
   instructions for, responsive to receiving the user input:
      updating the visual representation within the control area;
      regenerating the thread-native image to correspond to the updated visual representation; and
      sending the regenerated thread-native image to the second instance of the messenger for display within the thread area of the second instance.

\* \* \* \* \*

UNITED STATES PATENT AND TRADEMARK OFFICE
CERTIFICATE OF CORRECTION

PATENT NO. : 9,853,935 B2
APPLICATION NO. : 14/691893
DATED : December 26, 2017
INVENTOR(S) : Jason Duane Clark et al.

Page 1 of 1

It is certified that error appears in the above-identified patent and that said Letters Patent is hereby corrected as shown below:

In the Claims

Column 15, Line 59, after "interaction of the" delete "second".
Column 16, Line 63-64, after "interaction of the" delete "second".

Signed and Sealed this
Twelfth Day of June, 2018

Andrei Iancu
*Director of the United States Patent and Trademark Office*